PLUG-IN UNIT

Filed May 9, 1952 2 Sheets-Sheet 1

Inventor
John M. Alden
by Roberts, Cushman & Grover
attys.

Sept. 25, 1956 J. M. ALDEN 2,764,713

PLUG-IN UNIT

Filed May 9, 1952 2 Sheets-Sheet 2

Inventor
John M. Alden
by Roberts, Cushman & Grover
Att'ys.

2,764,713

PLUG-IN UNIT

John M. Alden, Wellesley, Mass.

Application May 9, 1952, Serial No. 287,078
11 Claims. (Cl. 317—101)

It has been the practice in the electronic art to lay out and wire the circuit components directly upon the chassis of the apparatus, a practice dating back to the early days of radio which is generally followed today in the manufacture of television receivers, computers, radar and other equipment having large chassis and many electrical components so that setting up a production line for such equipment is both expensive and complicated. A further disadvantage of the above-mentioned conventional construction is the difficulties in servicing where the isolating and replacing a defective component often requires considerable work and time during which the apparatus is out of operation.

It is accordingly the principal objects of this invention to provide a unit which permits the various electrically associated elements of a circuit to be grouped according to function and wired as simple separate subassemblies, which allows innumerable circuit and mounting variations with the use of a few standard elements, which results in an optimum layout of the components, which facilitates the economical manufacture of electronic and other electrical equipment, which is particularly adapted to high velocity production, which arranges the components in accessible positions for wiring and soldering, which permits servicing of equipment by others than highly skilled technicians, which reduces the time that equipment is out of operation, which aids in the isolation and replacement of defective circuit elements and which advances the art generally.

The present invention contemplates a plug-in unit having a base member with a plurality of contacts such as pins for engaging corresponding contacts in the recesses in a mating connector such as a socket. The pins are engaged and disengaged from the recesses of a mating socket by means of a handle preferably in the form of a bail the ends of which pass through apertures in a top or cover member to fasten to the base member. Interposed between the base member and cover member is supporting means such as one or more sheets or plates of an electrically nonconducting material upon which the circuit elements or components are printed or deposited in the well-known manner; or which has terminals for engaging the leads from the components thereby to support the components. The terminals are electrically linked to the base pins for example by short leads which are soldered thereto so that the components are connected in an external circuit when the pins engage the socket recesses. If a vacuum tube is included among the circuit components, the socket therefor is secured to the end of the sheet adjacent the cover member so that the portion of such socket having the recesses therein extending through an aperture in the cover member. The components are shielded, when required, by providing sides for the cover member which sides extend to the base member thereby to enclose the components.

These and other objects and aspects of the invention will be apparent from the following description of a specific embodiment of the invention which refers to a drawing wherein.

Figure 1:
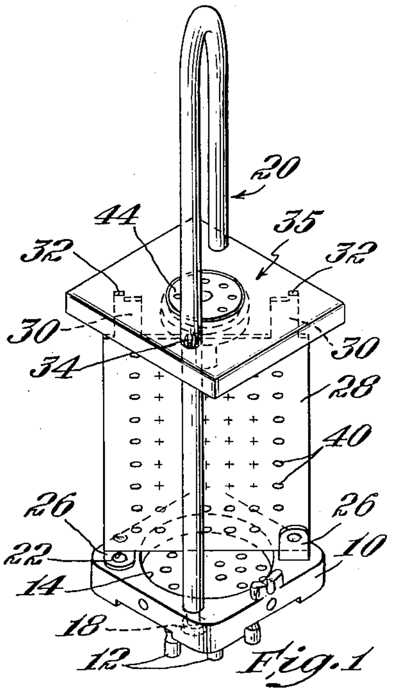
Fig. 1 is an isometric view of a first embodiment of the invention.
Figure 7:
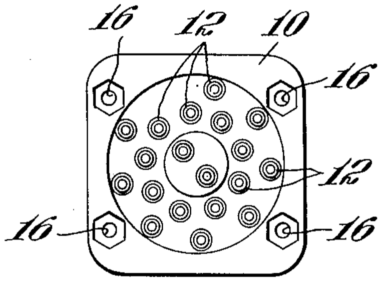
Fig. 7 is a bottom view of the base mmeber.

The first embodiment of the invention shown in Fig. 1 comprises a base member 10 which, as can best be seen in Fig. 7 is molded in a substantially square configuration with rounded corners or otherwise made of an electrical nonconducting material such as a suitable plastic material. Molded or otherwise secured in the base 10 are a plurality of hollow pins 12 the lower end of each of which projects beyond the bottom surface of the base so that the pins can engage corresponding recesses in a mating socket (not shown) which may be of conventional design and forms no part of the present invention. The outer ends of the pins 12 extend through the base 10 to the bottom of a large circular recess 14 in the top thereof. As is shown in Fig. 7, each corner of the base 10 has a respective aperture 16 molded therethrough. Two diagonally opposed apertures are used to receive cap screws 18 (Fig. 1) which engage threaded apertures in the respective ends of a handle such as the bail 20. The other two apertures 16 are provided for cap screws 22 secured by associated nuts (not shown) which are restrained in the hexagonal recesses (shown in Fig. 7) at the lower end of each aperture. Under the head of each screw 22 is disposed respectively, one leg of an L-shaped bracket 26 whose other leg is riveted to one of the bottom corners of a sheet or plate 28 of an electrically nonconducting material such as a suitable plastic so that the plate is supported substantially normally to the plane of the top of the base 10. Extending upwardly from the top of the plate 28 are two integrally formed arms 30 at each of whose ends is a respective lug 32 which engages a correlated aperture in a cover member 35 consisting of a square piece of sheet metal whose sides are bent downwardly. Two small circular apertures are provided in the top of the cover member 35 for accommodating the legs of the bail 20. Each of the legs of the bail 20 is staked or offset as at 34 to maintain the relative spacing of the base and cover members so that the lugs 32 do not become disengaged from the apertures in the cover member.

Figure 5:
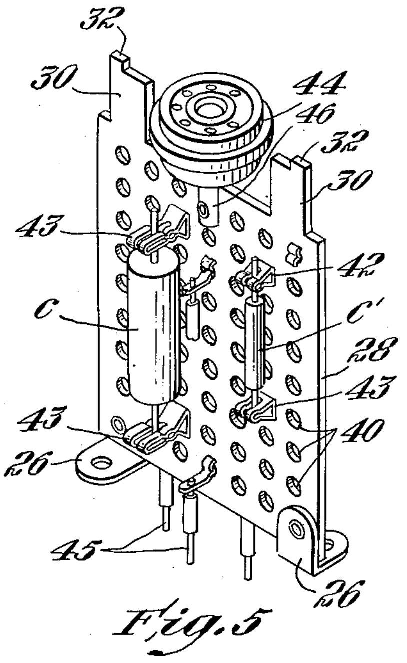
Fig. 5 is an isometric view showing the manner in which the various circuit components are attached to the supporting plate.
Figure 6:
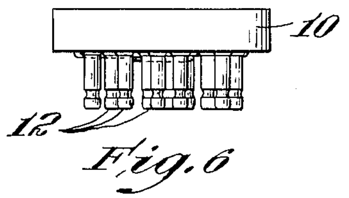
Fig. 6 is a side view of the base member.

As is best shown in Fig. 5, the plate 28 is provided with a plurality of rectilinearly disposed perforations 40 to permit the selective positioning of terminals 42 and 43, which are preferably similar to those in the copending application of Milton Alden, Serial No. 197,569, filed November 25, 1950, Patent No. ,640,185, issued May 26, 1953, thereby to accommodate components of different sizes such as *c* and *c'*. If a vacuum tube (not shown) is to be included among the circuit components, a socket 44 is supported by a bifurcated rod 46 which is riveted to the top of the plate 28 so that the socket engages a suitable aperture in the top of the cover member 35 such aperture being omitted when no tube is required. As is shown in Fig. 1, the bight portion of the bail 20 extends outwardly far enough to clear a vacuum tube. Electrical connections between the terminals 42 and 43 and the pins 12 in the base are made by insulated conductors or leads 45 whose ends are soldered thereto in the usual manner. It will be understood that the above described plate and terminals can be replaced by a "printed circuit" without departing from the spirit of the invention.

Figure 3:
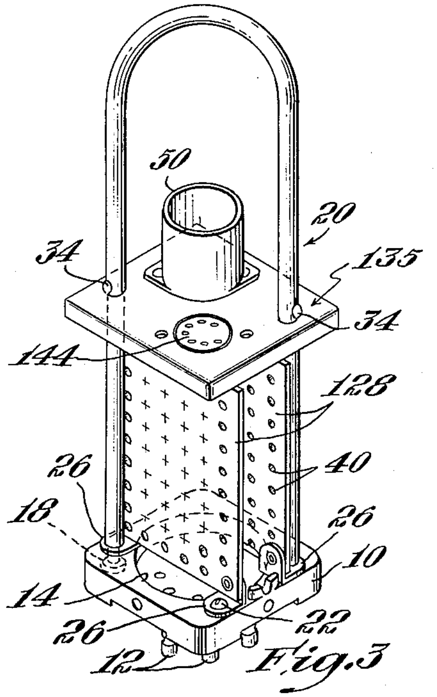
Fig. 3 is an isometric view of a third embodiment of the invention.
Figure 4:
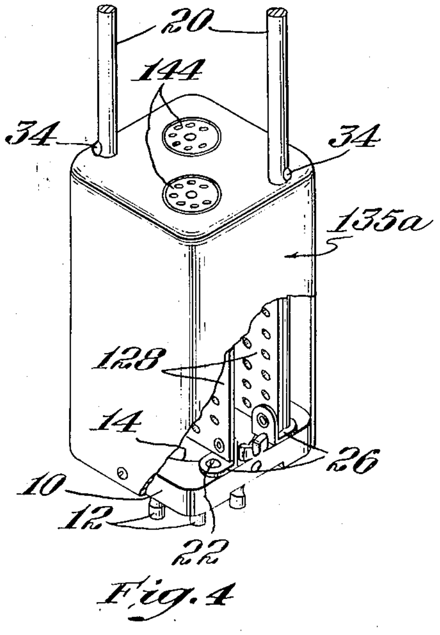
Fig. 4 is an isometric view with parts broken away of a fourth embodiment which also incorporates a shielding cover member.
Figure 2:
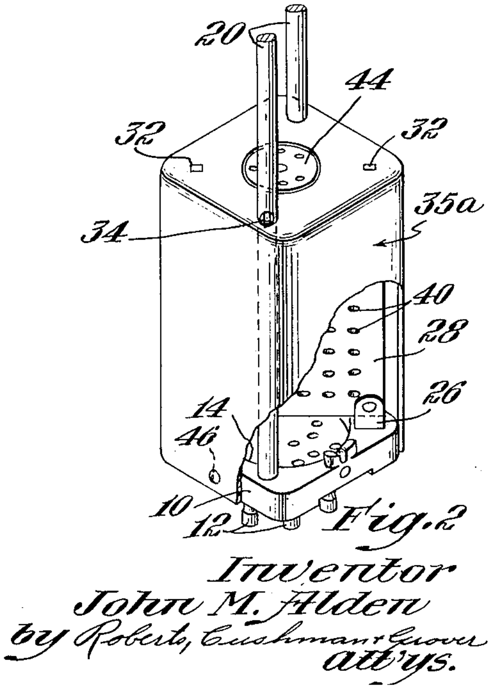
Fig. 2 is an isometric view with parts broken away of a second embodiment incorporating a shielding cover member.

If it is necessary or desirable to provide electrical shielding for the components, the sides of the cover 35a are extended to the base member 10 and are secured thereto by cap screws 46 thereby to enclose the components as is shown in the embodiment in Fig. 2. Another embodiment is shown in Fig. 3 wherein two parallel nonconducting plates 128 extend between the base and cover members. One bracket 26 of each plate is secured by one leg of the bail 20 whereas the other bracket is secured by the screw 22 in a manner similar to that described heretofore in connection with the description of the embodiment shown in Fig. 1. By using two parallel plates 128, two small vacuum tube sockets 144 can be accommodated, although it will be understood that two plates 128 can be used to provide more mounting space for components when no tubes are required, by the elimination of the tube sockets 144 and the use of a blank cover member 135. Fig. 3 also illustrates the manner in which a can 50 is riveted to the cover 135 to support a conventional shield (not shown) for the vacuum tube. Fig. 4 shows an embodiment in which the shielded cover member 135a is employed in a manner similar to the cover 35a in Fig. 2 as has been described in detail heretofore.

Any of the above described plug-in units can be used with conventional chassis which is provided with sockets for the units. The pins 12 on each differently wired unit are preferably disposed with a different configuration so that it is impossible to insert a unit in the wrong socket. When wiring the various units which go to make up a complete piece of electronic equipment it is preferable that all elements or components making up one stage or section be included in one unit, for example, one I. F. stage of a radio or television receiver or one memory section of a computor, the main chassis preferably only including wiring for interconnecting the recesses of the sockets for the plug-in units. Such wiring is greatly facilitated by removing the screws 18 and 22 so that the plates 28 (or 128) can be removed thus making it possible to break down the wiring into a number of small operations without the necessity of moving the entire chassis from one work station to another on a production line.

Equipment wired as described above can be much more readily serviced by a man with a minimum of experience by the sequential substitution of test units known to be good. The defective unit can then be replaced by a spare unit and the defect repaired when convenient without the necessity of taking out the chassis or removing the equipment from service.

It should be understood that the present disclosure is for the purpose of illustration only and that this invention includes all modifications and equivalents which fall within the scope of the appended claims.

I claim:

1. A mounting for electrical components comprising a plate of nonconducting material, said plate having a plurality of perforations for securing the terminals used to support the components, said perforations being arranged as a rectilinear grid to accommodate various sizes of components, a socket for a vacuum tube, a supporting rod for said socket, one end of which rod is secured to the socket, the other end of the rod being bifurcated to receive one edge of the plate, and a pin extending through one of said perforations and the adjacent bifurcated portions of the rod thereby to secure the rod to said plate.

2. A mounting for electrical components according to claim 1 wherein connector means is provided for interconnecting the components with an external circuit.

3. A mounting for electrical components according to claim 2 wherein the connector means includes a plurality of pins with axes extending substantially parallel to the plane of the plate.

4. A mounting for electrical components according to claim 1 wherein is further included a base member of nonconducting material having a plurality of contacts for engaging the mating contacts of a connector, the plate being attached to the base and extending at substantially right angles thereto.

5. A mounting for electrical components according to claim 4 wherein is further provided a cover member which is substantially parallel to the base member and the plate is interposed therebetween.

6. A mounting for electrical components according to claim 5 wherein the cover has an aperture therethrough for receiving the socket.

7. A mounting for electrical components according to claim 5 wherein the cover member is of metal and the sides thereof extend to the base member thereby to form a closure for said components.

8. A mounting for electrical components according to claim 4 wherein is further provided a bail which acts as a handle for disconnecting the contacts from the connector.

9. A mounting for electrical components according to claim 8 wherein the bail is connected to opposed corners of the base and the bight portion of the bail extends beyond the plate.

10. A mounting for electrical components comprising a plate of nonconducting material having a plurality of perforations arranged as a rectilinear grid for securing the terminals used to support components of various sizes, a socket for receiving a vacuum tube spaced from the plate and disposed with its axis substantially parallel to the plane of the plate, a supporting member extending between the socket and the plate, and a fastener projecting through one of the perforations to secure the member to the plate thereby to position the socket with respect to the plate.

11. A mounting for electrical components comprising a plate of nonconducting material having a planar surface with a plurality of perforations therethrough, means for engaging the perforations to support the components adjacent the planar surface of the plate, a socket for receiving a vacuum tube spaced from the plate and disposed with its axis substantially parallel to the plane of the plate, a supporting member extending between the socket and the plate, and a fastener projecting through one of the perforations to secure the member to the plate thereby to position the socket with respect to the plate.

References Cited in the file of this patent

UNITED STATES PATENTS

| | | |
|---|---|---|
| 2,186,184 | Tubbs | Jan. 9, 1940 |
| 2,382,428 | Leuvelink | Aug. 14, 1945 |
| 2,439,412 | Mitchell | Apr. 13, 1948 |
| 2,440,308 | Storck | Apr. 27, 1948 |
| 2,526,834 | Traugott et al. | Oct. 24, 1950 |
| 2,560,320 | Winkler | July 10, 1951 |
| 2,593,034 | Kafka | Apr. 15, 1952 |
| 2,637,763 | Palmer | May 5, 1953 |

FOREIGN PATENTS

| | | |
|---|---|---|
| 334,978 | Great Britain | Sept. 18, 1930 |
| 634,033 | France | Feb. 8, 1928 |
| 637,015 | France | Apr. 21, 1928 |
| 1,003,290 | France | Mar. 17, 1952 |